United States Patent
Ahmavaara et al.

(10) Patent No.: US 9,825,937 B2
(45) Date of Patent: Nov. 21, 2017

(54) CERTIFICATE-BASED AUTHENTICATION

(71) Applicant: QUALCOMM Incorporated, San Diego, CA (US)

(72) Inventors: Kalle Ilmari Ahmavaara, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 14/794,452

(22) Filed: Jul. 8, 2015

(65) Prior Publication Data

US 2016/0087972 A1   Mar. 24, 2016

Related U.S. Application Data

(60) Provisional application No. 62/054,272, filed on Sep. 23, 2014, provisional application No. 62/083,826, filed on Nov. 24, 2014.

(51) Int. Cl.
*G06F 21/00* (2013.01)
*H04L 29/06* (2006.01)
(Continued)

(52) U.S. Cl.
CPC .......... *H04L 63/0823* (2013.01); *G06F 21/62* (2013.01); *H04L 63/166* (2013.01);
(Continued)

(58) Field of Classification Search
CPC . H04L 63/0823; H04L 63/205; H04L 63/166; H04W 12/06; H04W 12/04; G06F 21/62
See application file for complete search history.

(56) References Cited

U.S. PATENT DOCUMENTS 8,412,157 B2   4/2013   Wang et al.
8,627,422 B2   1/2014   Hawkes et al.
(Continued)

OTHER PUBLICATIONS

3rd Generation Partnership Project; Technical Specification Group Services and System Aspects; 3GPP System Architecture Evolution (SAE); Security Architecture; (Release 12), 3GPP Standard; 3GPP TS 33.401, 3rd Generation Partnership Project (3GPP), Mobile Competence Centre; 650, Route Des Lucioles; F-06921 Sophia-Antipolis Cedex; France, V12.14.0, Mar. 1, 2015 (Mar. 1, 2015), pp. 1-131.

(Continued)

*Primary Examiner* — Mahfuzur Rahman
(74) *Attorney, Agent, or Firm* — Austin Rapp

(57) ABSTRACT

A method for authentication, operational in a device configured to communicate with a Long-Term Evolution (LTE) network, is described. The method includes receiving a first message from the LTE network that indicates the LTE network supports establishment of an LTE security context based on executing certificate-based authentication in lieu of subscriber identity module (SIM)-based authentication. The method also includes communicating one or more messages with the LTE network to execute certificate-based authentication. The method further includes establishing the LTE security context based on keys derived from the certificate-based authentication.

40 Claims, 10 Drawing Sheets

(51) Int. Cl.
  *G06F 21/62* (2013.01)
  *H04W 12/06* (2009.01)
  *H04W 12/04* (2009.01)

(52) U.S. Cl.
  CPC ........... *H04L 63/205* (2013.01); *H04W 12/06* (2013.01); *H04W 12/04* (2013.01)

(56) References Cited

U.S. PATENT DOCUMENTS

| | | | |
|---|---|---|---|
| 8,826,020 B2 | 9/2014 | Shah et al. | |
| 9,191,394 B2* | 11/2015 | Novak | H04L 63/102 |
| 2007/0249352 A1* | 10/2007 | Song | H04L 63/08 |
| | | | 455/436 |
| 2010/0017603 A1 | 1/2010 | Jones et al. | |
| 2010/0323700 A1* | 12/2010 | Bachmann | H04W 36/0066 |
| | | | 455/436 |
| 2011/0026435 A1* | 2/2011 | Weniger | H04W 8/065 |
| | | | 370/254 |
| 2011/0093938 A1 | 4/2011 | Asokan et al. | |
| 2011/0263225 A1* | 10/2011 | Escott | H04L 63/0823 |
| | | | 455/411 |
| 2011/0314287 A1 | 12/2011 | Escott et al. | |
| 2012/0124647 A1* | 5/2012 | Simula | H04L 63/0815 |
| | | | 726/4 |
| 2012/0288095 A1* | 11/2012 | McCann | H04W 40/36 |
| | | | 380/270 |
| 2013/0012165 A1 | 1/2013 | Popovich et al. | |
| 2013/0013923 A1* | 1/2013 | Thomas | H04W 12/06 |
| | | | 713/168 |
| 2014/0080450 A1 | 3/2014 | Gupta et al. | |
| 2014/0086177 A1* | 3/2014 | Adjakple | H04W 12/08 |
| | | | 370/329 |
| 2014/0134980 A1 | 5/2014 | Singh et al. | |
| 2014/0199967 A1 | 7/2014 | Varoglu et al. | |
| 2014/0213219 A1 | 7/2014 | Mohebbi | |
| 2014/0229587 A1 | 8/2014 | Mower et al. | |
| 2016/0065362 A1* | 3/2016 | Choyi | H04L 63/065 |
| | | | 380/279 |

OTHER PUBLICATIONS

Funk P., et al., "Extensible Authentication Protocol Tunneled Transport Layer Security Authenticated Protocol Version 0 (EAP-TTLSv0); RFC 5281", Internet Engineering Task Force (IETF), Aug. 2008 (Aug. 2008), pp. 1-51, XP015060268.

Simon D., et al., "The EAP-TLS Authentication Protocol; RFC 5216", Internet Engineering Task Force (IETF), Mar. 1, 2008 (Mar. 1, 2008), pp. 1-34, XP015055258.

International Search Report and Written Opinion—PCT/US2015/050602—ISA/EPO—dated Dec. 11, 2015.

* cited by examiner

CERTIFICATE-BASED AUTHENTICATION

RELATED APPLICATIONS

This application is related to and claims priority from U.S. Provisional Patent Application Ser. No. 62/054,272, filed Sep. 23, 2014, for "Certificate-Based Authentication." This application is also related to and claims priority from U.S. Provisional Patent Application Ser. No. 62/083,826, filed Nov. 24, 2014, for "Certificate-Based Authentication."

INTRODUCTION

The present disclosure relates generally to the field of communications, and more specifically, to systems and methods for authenticating a device to a network by communicating one or more certificates.

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmission power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), ultra mobile broadband (UMB), evolution data optimized (EV-DO), etc.

Generally, wireless multiple-access communication systems may simultaneously support communication for multiple devices. Each device may communicate with one or more base stations via transmissions on forward and reverse links. The forward link (or downlink) refers to the communication link from base stations to devices, and the reverse link (or uplink) refers to the communication link from devices to base stations. Further, communications between devices and base stations may be established via single-input single-output (SISO) systems, multiple-input single-output (MISO) systems, multiple-input multiple-output (MIMO) systems, and so forth. In addition, devices can communicate with other devices (and/or base stations with other base stations) in peer-to-peer wireless network configurations.

Before accessing a wireless communication network, a device may be required to authenticate. In many wireless communication networks, authentication may be performed using a subscriber identity module (SIM) card provided by the network operator. Some wireless communication networks, such as neutral-host (NH) networks, may need to allow a device to connect and securely authenticate without the use of a SIM card. Thus, systems and methods for authenticating a device to a wireless communication network by exchanging one or more certificates may be beneficial.

SUMMARY

A method for authentication, operational in a device configured to communicate with a Long-Term Evolution (LTE) network is described. The method includes receiving a first message from the LTE network that indicates the LTE network supports establishment of an LTE security context based on executing certificate-based authentication in lieu of subscriber identity module (SIM)-based authentication. The method also includes communicating one or more messages with the LTE network to execute certificate-based authentication. The method additionally includes establishing the LTE security context based on keys derived from the certificate-based authentication.

The first message from the LTE network may include a system information broadcast (SIB) message. The method may also include receiving a second message from the LTE network that indicates one or more authentication methods and one or more service providers supported by the LTE network. The method may further include receiving the second message in response to sending a request from a device.

The one or more messages may be communicated using one or more LTE non-access stratum (NAS) signaling messages. The one or more messages may include one or more Extensible Authentication Protocol (EAP) messages. The one or more EAP messages may be communicated using one or more LTE NAS signaling messages. The certificate based authentication may be performed using EAP—Transport Layer Security (EAP-TLS) or EAP—Tunneled Transport Layer Security (EAP-TTLS).

Communicating the one or more messages with the LTE network to execute the certificate-based authentication may include receiving a network certificate from an authentication server. The network certificate may be validated.

Validating the network certificate may include one or more of determining whether the network certificate is signed by a trusted certificate authority; determining whether the network certificate is expired; determining whether the network certificate is revoked; or determining whether the authentication server owns the network certificate.

Determining whether the network certificate is revoked may include verifying the network certificate is not in a certificate revocation list (CRL). Determining whether the network certificate is revoked may alternatively include querying an Online Certificate Status Protocol (OCSP) server.

Communicating the one or more messages with the LTE network to execute the certificate-based authentication may further include sending a device certificate to the authentication server. The device certificate may be encrypted based on information in the network certificate.

The method may also include receiving a request for user credentials. The user credentials may be sent to the LTE network.

The method may also include receiving a pseudonym from the LTE network. The method may further include sending the pseudonym to the LTE network instead of a device certificate in subsequent attempts to gain access to the LTE network.

The method may also include receiving a request to accept a service agreement. The method may further include sending a message accepting the service agreement.

The method may also include provisioning the device with a device certificate at a time the device is manufactured. The device certificate may uniquely identify a device. The device certificate may be based on at least one or a combination of a serial number, a media access control (MAC) ID, an international mobile station equipment identity (IMEI), or an international mobile subscriber identity (IMSI).

The method may also include provisioning a device with a device certificate using an enterprise certificate enrollment process. The enterprise certificate enrollment process may utilize a Simple Certificate Enrollment Protocol (SCEP).

The method may also include generating a self-signed device certificate on a device using public and private key pairs specific to the device. The method may further include generating the public and private key pairs on the device using a secret key programmed into a system-on-chip (SoC). The secret key may be shared with a trusted entity. The method may additionally include generating the public and private key pairs by running a key-provisioning protocol between the device and a trusted entity.

An apparatus configured to communicate with a Long-Term Evolution (LTE) network is also described. The apparatus includes a transceiver configured to receive a first message from the LTE network that indicates the LTE network supports establishment of an LTE security context based on executing certificate-based authentication in lieu of SIM-based authentication. The transceiver is also configured to communicate one or more messages with the LTE network to execute certificate-based authentication. The apparatus also includes a security-context establisher configured to establish the LTE security context based on keys derived from the certificate-based authentication.

Another apparatus configured to communicate with a Long-Term Evolution (LTE) network is described. The apparatus includes means for receiving a first message from the LTE network that indicates the LTE network supports establishment of an LTE security context based on executing certificate-based authentication in lieu of SIM-based authentication. The apparatus also includes means for communicating one or more messages with the LTE network to execute certificate-based authentication. The apparatus further includes means for establishing the LTE security context based on keys derived from the certificate-based authentication.

A computer-readable medium is also described. The computer-readable medium includes codes for causing a computer to receive a first message from an LTE network that indicates the LTE network supports establishment of an LTE security context based on executing certificate-based authentication in lieu of SIM-based authentication. The computer-readable medium also includes codes for causing the computer to communicate one or more messages with the LTE network to execute certificate-based authentication. The computer-readable medium further includes codes for causing the computer to establish the LTE security context based on keys derived from the certificate-based authentication.

A method for authentication in a Long-Term Evolution (LTE) network is also described. The method includes receiving an indication from a device that the device supports establishment of an LTE security context based on executing certificate-based authentication in lieu of SIM-based authentication. The method also includes communicating one or more messages with the device to execute certificate-based authentication. The method further includes establishing the LTE security context based on keys derived from the certificate-based authentication.

The indication may be received in an Attach message. The indication may be received as part of an Extensible Authentication Protocol (EAP) message. The one or more messages may be communicated using LTE non-access stratum (NAS) signaling messages. The one or more messages may include EAP messages.

Communicating the one or more messages with the device to execute the certificate-based authentication may include receiving a device certificate from the device. The device certificate may be validated.

Validating the device certificate may include determining that the device certificate is a self-signed device certificate; obtaining a public key for the device from a trusted entity; and verifying the self-signed device certificate is signed by the device based on the public key.

Validating the device certificate may include one or more of determining whether the device certificate is signed by a trusted certificate authority; determining whether the device certificate is expired; or determining whether the device owns the device certificate.

Validating the device certificate may further include determining whether the device certificate is revoked. Determining whether the device certificate is revoked may include one or a combination of verifying the device certificate is not in a certificate revocation list (CRL); or querying an Online Certificate Status Protocol (OCSP) server.

Validating the device certificate may further include one or a combination of determining whether the device is in a list of devices that are allowed access to the LTE network; or determining whether the device is not in a list of devices that are not allowed access to the LTE network.

The method may also include sending the device a network certificate.

The method may also include sending the device a request for user credentials. The method may further include receiving user credentials from the device.

The method may additionally include validating the user credentials. The method may also include granting the device access to the LTE network based on the user credentials.

The method may also include sending the device a pseudonym. The method may further include receiving the pseudonym from the device instead of a device certificate in subsequent requests to gain access to the LTE network.

The method may also include sending the device a request to accept a service agreement. The method may further include receiving from the device a message accepting the service agreement. The method may additionally include granting the device access to the LTE network based on the message accepting the service agreement.

An apparatus for authentication in a Long-Term Evolution (LTE) network is also described. The apparatus includes a transceiver configured to receive an indication from a device that the device supports establishment of an LTE security context based on executing certificate-based authentication in lieu of SIM-based authentication. The transceiver is also configured to communicate one or more messages with the device to execute certificate-based authentication. The apparatus also includes a security-context establisher configured to establish the LTE security context based on keys derived from the certificate-based authentication.

Another apparatus for authentication in a Long-Term Evolution (LTE) network is also described. The apparatus includes means for receiving an indication from a device that the device supports establishment of an LTE security context based on executing certificate-based authentication in lieu of SIM-based authentication. The apparatus also includes means for communicating one or more messages with the device to execute certificate-based authentication. The apparatus further includes means for establishing the LTE security context based on keys derived from the certificate-based authentication.

A non-transitory computer-readable medium is also described. The computer-readable medium includes codes for causing a computer to receive an indication from a device that the device supports establishment of a Long-Term Evolution (LTE) security context based on executing certificate-based authentication in lieu of SIM-based authentication. The computer-readable medium also includes codes for causing the computer to communicate one or more messages with the device to execute certificate-based authentication. The computer-readable medium also includes codes for causing the computer to establish the LTE security context based on keys derived from the certificate-based authentication.

DETAILED DESCRIPTION

Figure 1:
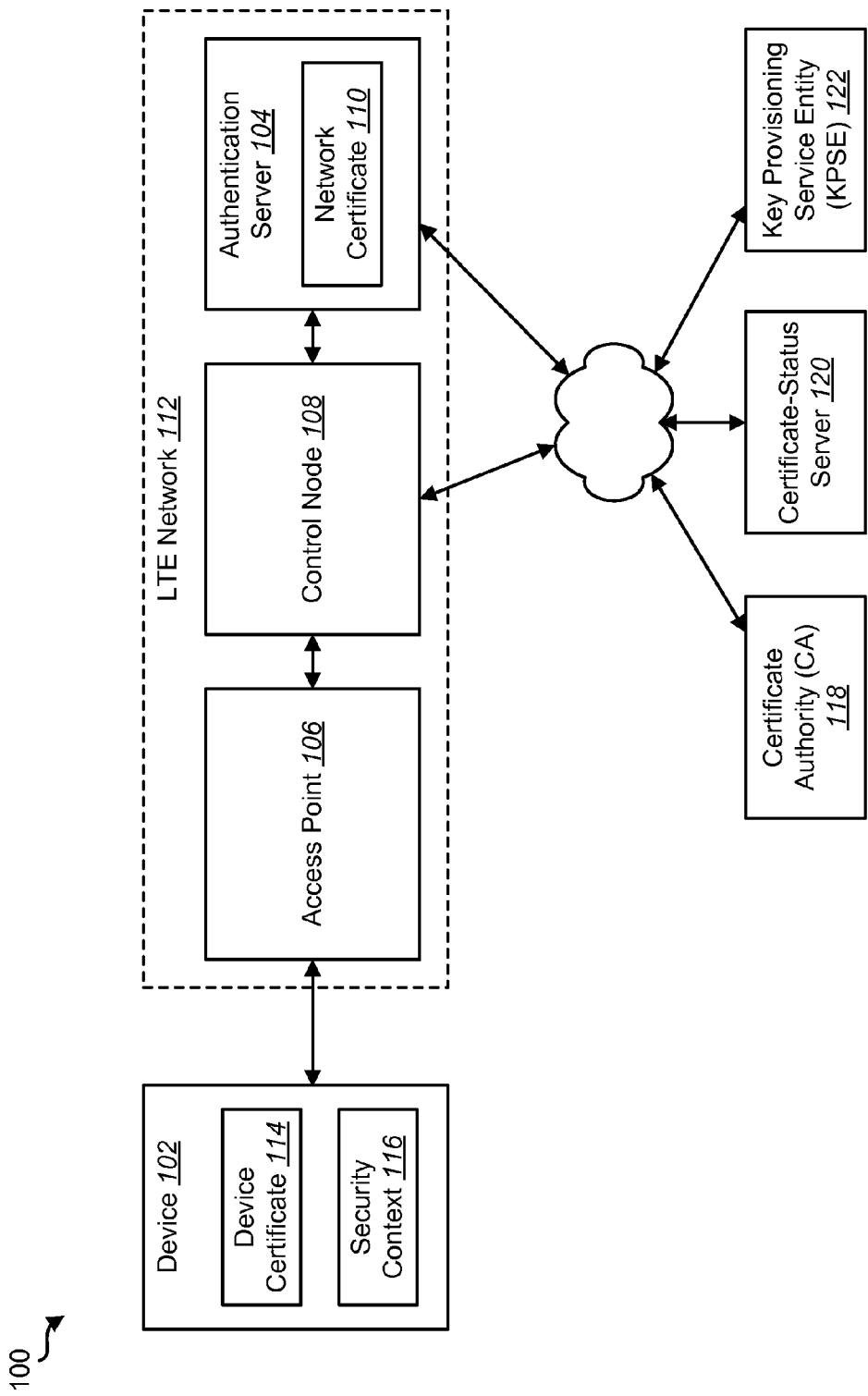
FIG. 1 illustrates an example wireless communication system.

In LTE networks, currently the only way to authenticate a device is to use a SIM card provided by a particular mobile network operator. However, for neutral host (NH) LTE networks, there is a need to allow any device to connect and securely authenticate itself to any NH LTE network. This needs to be possible without relying on a SIM card and without requiring the device to be provisioned with credentials specific to an NH network.

The systems and methods described herein provide for authenticating a device to a network by communicating one or more certificates. The device may be pre-provisioned with a unique device certificate. Upon receiving the device certificate from the device, an NH LTE network may execute certificate-based authentication (instead of traditional SIM-based authentication). The NH LTE network may then establish a security context for the device based on keys derived from the certificate-based authentication. Therefore, an NH-enabled LTE device may connect with and securely authenticate itself to any NH-enabled LTE network, and subsequently acquire services from the connected NH LTE network.

Various aspects are now described with reference to the drawings. In the following description, for purposes of explanation, numerous specific details are set forth in order to provide a thorough understanding of one or more aspects. It may be evident that such aspect(s) may be practiced without these specific details.

In various aspects, systems and methods for certificate-based authentication are described. The description may refer to a device. A device can also be called a system, mobile device, subscriber unit, subscriber station, mobile station, mobile, remote station, mobile terminal, remote terminal, access terminal, user terminal, terminal, communication device, user agent, user device, or user equipment (UE). A device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more base stations (BS) that provide cellular or wireless network access to the device.

A base station (BS) may be utilized for communicating with device(s) and may also be referred to as an access point 106, femto node, a pico node, micro node, a Node B, evolved Node B (eNB), home Node B (HNB) or home evolved Node B (HeNB), collectively referred to as H(e)NB, or some other terminology. These base stations may be considered low-power base stations. For example, a low-power base station may transmit at a relatively low power as compared to a macro base station associated with a wireless wide area network (WWAN). As such, the coverage area of the low-power base station can be substantially smaller than the coverage area of a macro base station.

The techniques described herein may be used for various wireless communication systems such as CDMA, TDMA, FDMA, OFDMA, SC-FDMA, Wi-Fi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless local area network (LAN), Bluetooth, and any other short- or long-range, wireless communication techniques.

Various aspects or features will be presented in terms of systems that may include a number of devices, components, modules, and the like. It is to be understood and appreciated that the various systems may include additional devices, components, modules, etc., and/or may not include all of the devices, components, modules, etc., discussed in connection with the figures. A combination of these approaches may also be used.

FIG. 1 illustrates an example wireless communication system 100. The wireless communication system 100 may comprise a device 102, an LTE network 112, a certificate authority (CA) 118, a certificate-status server 120, and a key provisioning service entity (KPSE) 122. It may also comprise other devices or network nodes not illustrated. The LTE network 112 may include one or more of an access point 106, a control node (CN) 108, an authentication server 104. The device 102, access point 106, control node 108, authentication server 104, certificate authority 118, certificate-status server 120, and KPSE 122 may communicate over one or more wired or wireless links.

Communications in the wireless communication system 100 may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. In some configurations, the wireless communication system 100 may utilize MIMO. A MIMO system may support time division duplex (TDD) and/or frequency division duplex (FDD) systems.

In some configurations, the wireless communication system 100 may operate in accordance with one or more standards. Examples of these standards include Bluetooth (e.g., Institute of Electrical and Electronics Engineers (IEEE) 802.15.1), IEEE 802.11 (Wi-Fi), IEEE 802.16 (Worldwide Interoperability for Microwave Access (Wi-MAX), Global System for Mobile Communications (GSM), Universal Mobile Telecommunications System (UMTS), CDMA2000, Long-Term Evolution (LTE), etc.

In some configurations, the wireless communication system 100 may be a multiple-access system capable of supporting communication with multiple devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, General Packet Radio Service (GPRS) access network systems, 3rd Generation Partnership Project (3GPP) Long-Term Evolution (LTE) systems, and spatial division multiple access (SDMA) systems.

In LTE networks 112, a subscriber identity module (SIM) card provided by a mobile network operator may be used to authenticate a device 102 to a network. However, for neutral-host (NH) LTE networks, there may be a need to allow any device 102 to connect and securely authenticate to any NH LTE network without a SIM card and without pre-provisioning of network-specific credentials.

A NH network may be a set of NH access networks that are managed by or have a roaming relationship with a NH network service provider. A NH access network may be locally owned and operated, for example, by a cable operator or an enterprise, as a hotspot, or in a residence. In one example, a NH network may be a femto cell network that allows access to devices 102 from other network operators. The femto cell network may be installed at a specific venue (e.g., a mall, a stadium, or a business) and may provide enhanced coverage or capacity.

The LTE network 112 described herein may be a NH network. In one configuration, the LTE network 112 may authenticate a device 102 before the device 102 is permitted to use services on the LTE network 112. For example, the LTE network 112 may authenticate the device 102 based on a device certificate 114. In another configuration, the device 102 and the LTE network 112 may authenticate each other before the device 102 is permitted to use services on the LTE network 112. For example, the device 102 may authenticate the LTE network 112 based on a network certificate 110, and the LTE network 112 may authenticate the device 102 based on a device certificate 114.

Certificate-based authentication of the NH LTE network 112 may prevent the LTE network 112 from masquerading as another network. The certificate-based authentication process may ensure that user identity privacy (i.e., device 102 identity) is no worse than in a standard LTE network. For example, the process may not send in the clear information that may be used to identify the user or the device 102. In other words, a passive eavesdropper or the NH-access LTE network 112 itself may not have access to the information that may be used to track the user or the device 102.

A device 102 may be provisioned with a unique device certificate 114. The device certificate 114 may uniquely identify the device 102 using a unique identifier (ID), such as a serial number, media access control (MAC) address, international mobile station equipment identity (IMEI), or international mobile subscriber identity (IMSI). In one example, the unique identifier may be a globally unique IMSI value that is not associated with any existing mobile network operator. The device certificate 114 may not be specific to a particular NH network; the device certificate 114 may be used to securely authenticate the device 102 to any NH network.

In one configuration, the device 102 may be provisioned with the device certificate 114 as part of the device 102 manufacturing process. In another configuration, the device 102 may be provisioned with the device certificate 114 using an enterprise certificate enrollment process. For example, the device 102 may be provisioned with the device certificate 114 using the simple certificate enrollment protocol (SCEP).

The device certificate 114 for each device 102 may be generated by a certificate authority (CA) 118. The CA 118 may be an original equipment manufacturer (OEM) or a third party. In one configuration, there may be a root CA 118 and one or more intermediate CAs 118 that are authorized to issue device certificates 114. Provisioning of device certificates 114 may require a secure channel to transfer the device certificate 114 from the CA 118 to the manufacturer.

In another configuration, the device certificate 114 for each device 102 may be generated on the device 102 itself as a self-signed device certificate 114 using device-specific public and private key pairs. The public and private key pairs may be generated on the device 102 using a system-on-chip (SoC)-specific unique secret key that is programmed into the SoC and shared with the key provisioning service entity (KPSE) 122. The private and public key-generation may involve running a key-provisioning protocol between the device 102 and the KPSE 122. The self-signed device certificate 114 of the device 102 may be verified by the authentication server 104 using a public key obtained from the KPSE 122.

The device 102 may further be provided with a list of trusted CAs 118 that are authorized to issue network certificates 110 to NH network servers. This list may be a common list for all devices 102 that are able to connect to NH networks.

In one configuration, the device 102 may also be provided with the address of a certificate-status server 120. The certificate-status server 120 may be an Online Certificate Status Protocol (OCSP) server. The device 102 may use the address of the certificate-status server 120 to query the certificate-status server 120 to verify that a network certificate 110 has not been revoked. In another configuration, the device 102 may be provided with a certificate revocation list (CRL). The CRL may be a list of network certificates 110 that have been revoked. The device 102 may use the CRL to verify that a network certificate 110 has not been revoked.

The device 102 may communicate with the control node 108 via the access point 106. In one configuration, the control node 108 may be a mobility management entity (MME). In this configuration, LTE non-access stratum (NAS) signaling may be enhanced to carry Extensible Authentication Protocol (EAP) messages between the device 102 and the control node 108. The device 102 may indicate support for certificate-based authentication or neutral-host operation in an Attach message. The control node 108 may then use this indication to start a certificate-based authentication process between the device 102 and the authentication server 104. An LTE network 112 that comprises such an enhanced control node 108 to support EAP-based authentication may be known as a neutral-host LTE network or NH LTE network.

In one configuration, the authentication server 104 may be an authentication, authorization, and accounting (AAA) server. In this configuration, the control node 108 (e.g., MME) may be enhanced to interface with the authentication server 104 (e.g., AAA server) using EAP. For example, the control node 108 may interface with the authentication server 104 using EAP and authenticate the device 102 using Transport Layer Security (EAP-TLS) as defined in IETF RFC 5216. In another example, the control node 108 may interface with the authentication server 104 using EAP and authenticate the device 102 using Tunneled Transport Layer Security (EAP-TTLS) as defined in IETF RFC 5281.

In one configuration, the TLS client authentication of the device 102 is performed by the authentication server 104 (e.g., AAA server) using a generated device self-signed device certificate 114 (described above). In the EAP-TTLS method, further user authentication (e.g., username and password, secured ID token, or another well-known method of user authentication) may be performed by the authentication server 104 after TLS client authentication of the device 102 using the device self-signed device certificate 114.

The EAP messages may be carried over remote authentication dial-in user service (RADIUS) or Diameter protocols between the control node 108 and the authentication server 104. At the conclusion of the authentication process, the authentication server 104 may send an EAP master session key (MSK) to the control node 108. The control node 108 may use the MSK to derive the key $K_{ASME}$, which may be used for LTE NAS and access stratum (AS) security as defined in 3GPP TS 33.401.

The device 102 may establish an LTE security context 116 based on the keys derived from the certificate-based authentication. The security context 116 may store information about the LTE network 112, the network certificate 110 of the LTE network 112, a pseudonym associated with the LTE network 112, and/or the authentication process for the LTE network 112. The device 102 may generate a security context 116 after the device 102 is authenticated to the LTE network 112 using the device certificate 114. The device 202 may use the security context 116 instead of the device certificate 114 to reconnect to the LTE network 112 on a subsequent attempt to access the LTE network 112.

The authentication server 104 may be provided with a list of trusted CAs 118 that are authorized to issue device certificates 114 to devices 102. In another configuration, the authentication server 104 may be provided with a list of at least the device 102 identity and the public key associated with the self-signed device certificate 114 of NH-capable devices 102. The authentication server 104 may use the public key associated with the device 102 identity to verify the authenticity of the self-signed device certificate 114.

In one configuration, the authentication server 104 may be provided with a list of devices 102 authorized to access services on the LTE network 112 (e.g., a whitelist). The authentication server 104 further may be provided with a list of devices 102 that are not authorized to access services on the LTE network 112 (e.g., a blacklist) After successful authentication of the device 102 using a device certificate 114, the authentication server 104 may optionally perform further authorization checks using this list before granting network access to the device 102.

The authentication server 104 may verify that a device certificate 114 has not been revoked. In one configuration, the authentication server 104 may be provided with the address of the certificate-status server 120 (e.g., OCSP server). The authentication server 104 may use the address of the certificate-status server 120 to query the certificate-status server 120 to verify that the device certificate 114 has not been revoked. In another configuration, the authentication server 104 may be provided with a certificate revocation list (CRL). In this case, the CRL may be a list of device certificates 114 that have been revoked. The authentication server 104 may use the CRL to verify that a device certificate 114 has not been revoked.

The authentication server 104 may additionally be provided with a service agreement. After validating the device certificate 114, or otherwise validating the credentials of the device 102 to access the LTE network 112, the authentication server 104 may send the device 102 the service agreement, or otherwise cause the device 102 to receive information about service agreements required for receiving full service via the LTE network 112. This may be done, for example, by the authentication server 104 configuring the LTE network 112 to cause web access requests to be redirected to a service agreement portal.

The device 102, or the user of the device 102, may be required to accept the service agreement to access services through the LTE network 112. In one configuration, the service agreement may set conditions for using the LTE network 112. In another configuration, the service agreement may include billing information. By agreeing to the service agreement, the user of the device 102 may accept responsibility for paying for the services accessed by the device 102. In another configuration, the service agreement may involve payment of a billing amount using any one of a plurality of well-known payment methods.

Upon successful execution of the service agreement, the authentication server 104 may associate a unique device ID with an account linked to the user responsible for payment. In subsequent visits to the LTE network 112, the authentication server 104 may grant access to an authenticated device 102 without requiring the device 102, or the user of the device 102, to re-accept the service agreement based on the device 102 having previously accepted the service agreement.

The authentication server 104 may also be provided with a network certificate 110 that the device 102 may use to authenticate the LTE network 112. The network certificate 110 may be provided by a CA 118. In one configuration, one root CA 118 may issue network certificates 110 for all NH networks. The root CA 118 may also maintain a certificate-status server 120 (e.g., OCSP server) that devices 102 may query to verify that a network certificate 110 has not been revoked. Having a single CA 118 issue all network certificates 110 may reduce complexity. It may also increase the risk of masquerading NH networks if the CA 118 or a network certificate 110 is compromised.

In another configuration, the root CA 118 may authorize one or more intermediate CAs 118. The intermediate CAs 118 may then issue network certificates 110. In this configuration, the root CA 118 may maintain a revocation list of intermediate CAs 118. Further, an intermediate CA 118 may maintain a revocation list for the certificates (e.g., device certificates 114 and/or network certificates 110) the intermediate CA 118 has issued.

Figure 2:
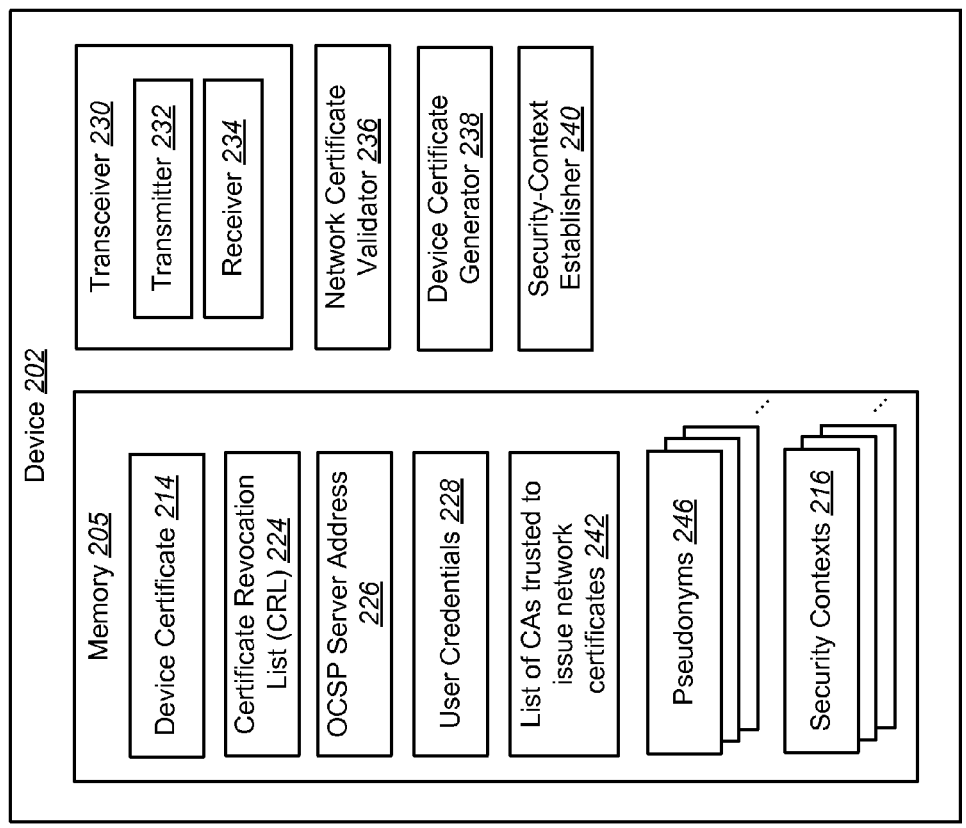
FIG. 2 is a block diagram illustrating an example device.

FIG. 2 is a block diagram illustrating an example device 202. The device 202 may include a transceiver 230, a network certificate validator 236, a device certificate generator 238, a security-context establisher 240 and memory 205. The device 202 may be capable of communicating with an LTE network 112. In one configuration, the LTE network 112 may be a neutral-host (NH) LTE network.

The transceiver 230 may include a transmitter 232 and a receiver 234. The transmitter 232 may enable the device 202 to transmit messages in the wireless communication system 100. The receiver 234 may enable the device 202 to receive messages in the wireless communication system 100.

The network certificate validator 236 may enable the device 202 to validate network certificates 110. For example, the device 202 may receive a network certificate 110 from an authentication server 104. In one configuration, the network certificate validator 236 may validate a network certificate 110 by determining whether the network certificate 110 is signed by a trusted CA 118, whether the network certificate 110 is expired, whether the network certificate 110 is revoked, and/or whether the authentication server 104 is the owner of the network certificate 110.

The device certificate generator 238 may enable the device 202 to generate and sign a self-signed device certificate 214. The security-context establisher 240 may enable the device 202 to establish a security context 216 after performing certificate-based authentication with a network.

The device 202 may further include a device certificate 214, a certificate revocation list (CRL) 224, an OCSP server address 226, user credentials 228, a list 242 of CAs 118 trusted to issue network certificates 110, one or more security contexts 216, and one or more pseudonyms 246 stored in the memory 205.

The device 202 may use the device certificate 214 to authenticate to the LTE network 112. For example, the device 202 may send the device certificate 214 to the authentication server 104. The authentication server 104 may determine whether the device certificate 214 is signed by a trusted CA 118, whether the device certificate 214 is expired, whether the device certificate 214 is revoked, and/or whether the device 202 is the owner of the device certificate 214.

The network certificate validator 236 may use the CRL 224, the OCSP address 226, and the list 242 of CAs 118 trusted to issue network certificates 110 to validate a network certificate 110. For example, the network certificate validator 236 may check the CRL 224 or query an OCSP server at the OCSP server address 226 to determine whether a network certificate 110 has been revoked. The network certificate validator 236 may use the list 242 of CAs 118 trusted to issue network certificates 110 to determine whether the network certificate 110 is signed by a trusted CA 118.

The device 202 may use the user credentials 228 in addition to or in place of the device certificate 214 to authenticate to the LTE network 112. For example, a NH network operated by an enterprise may require the device 202 to authenticate using user credentials 228 (e.g., username and password, etc.) as an added security measure.

The device 202 may use the one or more pseudonyms 246 to authenticate to the LTE network 112 that the device 202 has previously authenticated to using the device certificate 214. For example, to enhance user privacy, the LTE network 112 may issue the device 202 a pseudonym 246 or other re-authentication identity after the device 202 successfully authenticates using the device certificate 214. In subsequent attempts to gain access to the LTE network 112, the device 202 may present the pseudonym 246 to the LTE network 112 rather than send the device certificate 214. This may enable the device 202 to avoid sending the device certificate 214 in the clear in subsequent visits to the LTE network 112.

The device 202 may store one or more security contexts 216, with each security context 216 associated with a visited NH network. The security context 216 may store information about the LTE network 112, the network certificate 110 of the LTE network 112, a pseudonym 246 associated with the LTE network 112, and the authentication process for the LTE network 112. The device 202 may use the one or more security contexts 216 to reconnect to a previously visited NH network. The security-context establisher 240 may generate a security context 216 after the device 202 is authenticated to the LTE network 112 using the device certificate 214.

Figure 3:
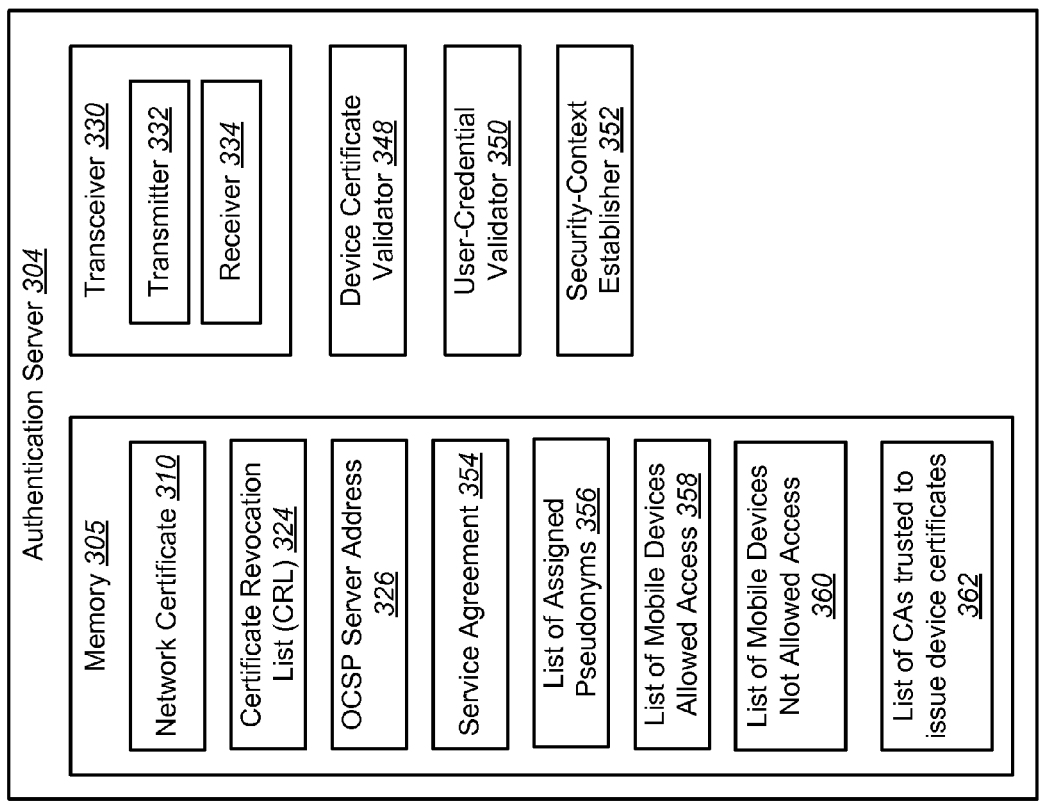
FIG. 3 is a block diagram illustrating an example authentication server.

FIG. 3 is a block diagram illustrating an example authentication server 304. The authentication server 304 may include a transceiver 330, a device certificate validator 348, a user-credential validator 350, a security-context establisher 352 and memory 305.

The transceiver 330 may include a transmitter 332 and a receiver 334. The transmitter 332 may enable the authentication server 304 to transmit messages in the wireless communication system 100. The receiver 334 may enable the authentication server 304 to receive messages in the wireless communication system 100. In one configuration, the authentication server 304 may be included in an LTE network 112.

The device certificate validator 348 may enable the authentication server 304 to validate device certificates 114. For example, the authentication server 304 may receive a device certificate 114 from device 102. In one configuration, the device certificate validator 348 may validate the device certificate 114 by determining whether the device certificate 114 is signed by a trusted CA 118, whether the device certificate 114 is expired, and/or whether the device 102 is the owner of the device certificate 114. In another configuration, the device certificate validator 348 may also determine whether the device certificate 114 is revoked.

The user-credential validator 350 may enable the authentication server 304 to validate user credentials 228. For example, the user-credential validator 350 may verify that a password is associated with a username. Other methods for verifying user credentials 228, such as the use of a secure token or biometrics, may also be used.

The security-context establisher 352 may enable the authentication server 304 to help establish a security context 116 for a device 102 after the device 102 has been authenticated to the LTE network 112. The security context 116 may store information about the LTE network 112, the network certificate 310 of the LTE network 112, a pseudonym 246 associated with the LTE network 112, and the authentication process for the LTE network 112. A device 102 may use a security context 116 to reconnect to the LTE network 112 in a subsequent visit.

The authentication server 304 may also include a network certificate 310, a CRL 324, an OCSP server address 326, a service agreement 354, a list 356 of assigned pseudonyms 246, a list 358 of devices 102 allowed access to the network (e.g., a whitelist), a list 360 of devices 102 not allowed access to the network (e.g., a blacklist), and a list 362 of CAs 118 trusted to issue device certificates 114 stored in the memory 305.

The authentication server 304 may use the network certificate 310 to authenticate to a device 102. For example, the authentication server 304 may send the network certificate 310 to the device 102. The device 102 may determine whether the network certificate 310 is signed by a trusted CA 118, whether the network certificate 310 is expired, whether the network certificate 310 is revoked, and/or whether the authentication server 304 is the owner of the network certificate 310.

The device certificate validator 348 may use the CRL 324, the OCSP server address 326, and the list 362 of CAs 118 trusted to issue device certificates 114 to validate a device certificate 114. For example, the device certificate validator 348 may check the CRL 324 or query the OCSP server at the OCSP server address 326 to determine whether a device certificate 114 has been revoked. The device certificate validator 348 may use the list 362 of CAs 118 trusted to issue device certificates 114 to determine whether the device certificate 114 is signed by a trusted CA 118.

The authentication server 304 may maintain a list 356 of assigned pseudonyms 246 it has issued to devices 102. The authentication server 304 may then use the pseudonym 246 from the device 102 when the device 102 makes subsequent attempts to authenticate to the LTE network 112.

The authentication server 304 may require a device 102 to accept the conditions of the service agreement 354, including information about billing, before authorizing the device 102 to access the LTE network 112.

The authentication server 304 may use the list 358 of devices 102 allowed to access the LTE network 112 and the list 360 of devices 102 not allowed to access the LTE network 112 to determine whether to authorize a device 102 to access the LTE network 112. For example, the authentication server 304 may authorize a device 102 with a valid device certificate 114 if the device 102 is identified in the list 358 of devices 102 allowed to access the LTE network 112. In another example, the authentication server 304 may deny access to a device 102 if the device 102 is identified in the list 360 of devices 102 not allowed to access the LTE network 112, regardless of whether the device 102 has a valid device certificate 114.

Figure 4:
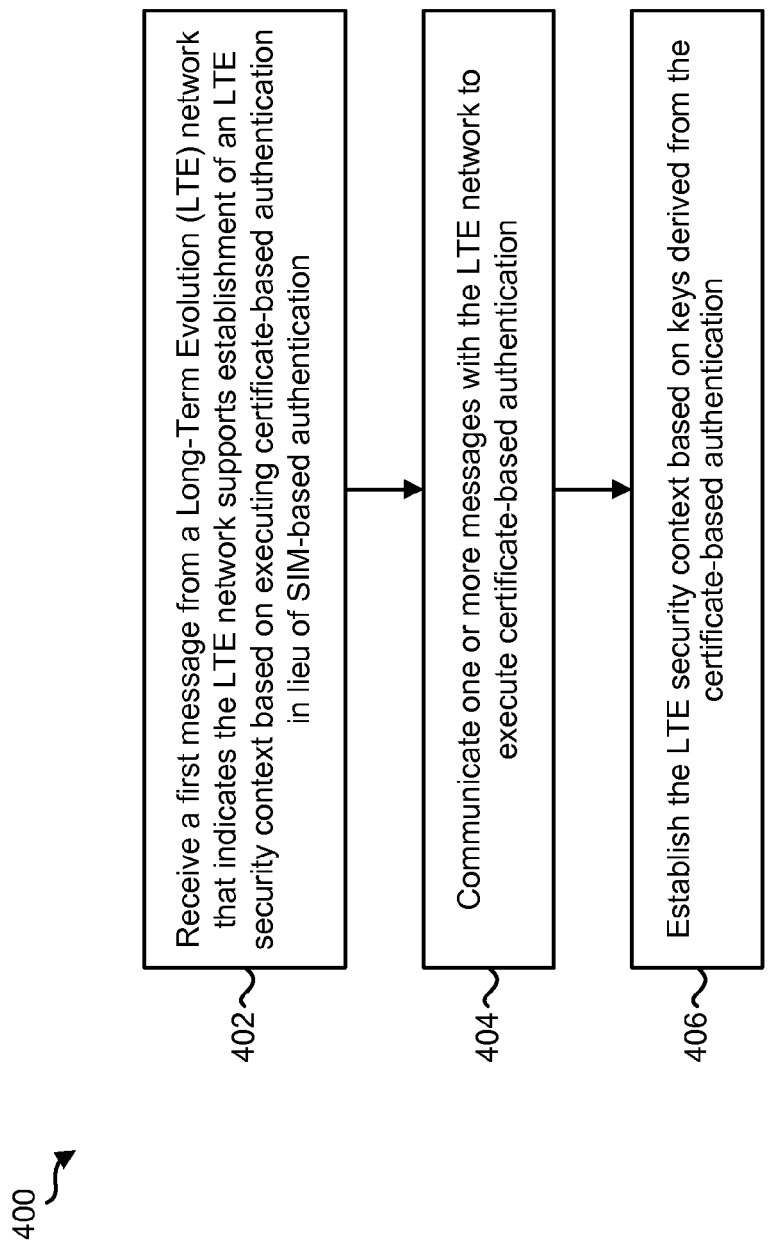
FIG. 4 is a flow diagram illustrating one configuration of a method for authentication that may be performed by a device.

FIG. 4 is a flow diagram illustrating one configuration of a method 400 for authentication that may be performed by a device 102. The device 102 may be capable of communicating with an LTE network 112. In one configuration, the LTE network 112 may be a neutral-host (NH) LTE network. Therefore, the method 400 may be performed for LTE-access authentication.

The device 102 may receive 402 a first message from an LTE network 112 that indicates the LTE network supports establishment of an LTE security context 116 based on executing certificate-based authentication in lieu of SIM-based authentication. In one configuration, the first message may be a system information broadcast (SIB) message sent from the LTE network 112.

The SIB message may include an indication that the LTE network 112 supports certificate-based authentication and/or neutral-host operation. The indication may be a specific network identifier value reserved for neutral-host use, or another indication that a NH-enabled device 102 understands to mean that the LTE network 112 supports certificate-based authentication. For example, the indication may be included in a new field in an existing SIB message, as a new value in an existing field of an existing SIB message, or as part of a new SIB message.

In one implementation, in response to receiving 402 the first message from the LTE network 112, the device 102 may send a request for authentication methods and service providers supported by the LTE network 112. The device 102 may receive a second message from the LTE network 112 that indicates the authentication methods and service providers supported by the LTE network 112.

The device 102 may send a request to connect to the LTE network 112. The request may indicate support for certificate-based authentication. In one configuration, the device 102 may perform a network Attach procedure with the LTE network 112. During the Attach procedure, the device 102 may indicate to the LTE network 112 that the device 102 supports neutral-host operation and/or certificate-based authentication, or that the device 102 intends to connect to the neutral-host LTE network 112. The indication may be a network identifier value reserved for neutral-host operation in the Attach signaling or some other mechanism whereby the device 102 informs the LTE network 112 that the device 102 is neutral-host enabled, supports certificate-based authentication, and/or is attempting to connect to the neutral-host LTE network 112.

The device 102 may communicate 404 one or more messages with the LTE network 112 to execute certificate-based authentication. As used herein, communicating one or more messages may include sending a message, receiving a message or a combination of sending a message and receiving a message. Therefore, communicating one or more messages may include exchanging one or more messages. Additionally, communicating one or more messages may include performing one or more actions upon sending or receiving the one or more messages.

In one configuration, the one or more messages are communicated using LTE non-access stratum (NAS) signaling messages. The one or more messages may include Extensible Authentication Protocol (EAP) messages.

In one configuration, LTE non-access stratum (NAS) signaling may be enhanced to carry Extensible Authentication Protocol (EAP) messages between the device 102 and a control node 108 (e.g., an MME) in the LTE network 112. The device 102 may indicate support for certificate-based authentication or neutral-host operation in an Attach message. The control node 108 may then use this indication to start a certificate-based authentication process between the device 102 and an authentication server 104.

To execute the certificate-based authentication, the device 102 may receive a network certificate 110 from the authentication server 104. The device 102 may then validate the network certificate 110. As part of the validation process, the device 102 may determine whether the network certificate 110 is signed by a trusted certificate authority 118. The device 102 may also determine whether the network certificate 110 is expired. The device 102 may additionally determine whether the authentication server 104 owns the network certificate 110.

The device 102 may further determine whether the network certificate 110 is revoked. This may be accomplished by the device 102 verifying the network certificate 110 is not in a certificate revocation list (CRL) 224. Alternatively, the device 102 may query a certificate-status server 120 (e.g., OCSP server) to determine whether the network certificate 110 is revoked.

As part of the certificate-based authentication, the device 102 may also send a device certificate 114 to the authentication server 104. The device certificate 114 may be encrypted based on information in the network certificate 110. The device certificate 114 may uniquely identify the device 102. For example, the device certificate 114 may identify the device 102 using a unique identifier (ID), such as a serial number, media access control (MAC) address, international mobile station equipment identity (IMEI), or international mobile subscriber identity (IMSI).

In one configuration, the device 102 may be provisioned with the device certificate 114. In one implementation, the device 102 may be provisioned with the device certificate 114 at a time the device 102 is manufactured. In another implementation, the device 102 may be provisioned with the device certificate 114 using an enterprise certificate enrollment process. For example, the enterprise certificate enrollment process may utilize a simple certificate enrollment protocol (SCEP).

In another configuration, the device 102 may generate a self-signed device certificate 114 using public and private key pairs specific to the device 102. The device 102 may generate the public and private key pairs using a secret key programmed into a system-on-chip (SoC). The device 102 may further generate the public and private key pairs by running a key-provisioning protocol between the device 102 and a trusted entity (e.g., a key provisioning service entity (KPSE) 122). The device 102 may share the public key with the trusted entity. The self-signed device certificate 114 of the device 102 may be verified by an authentication server 104 using a public key obtained from the KPSE 122.

The device 102 may establish 406 the LTE security context 116 based on keys derived from the certificate-based authentication. At the conclusion of the authentication, the device may use the EAP master session key (MSK) resulting from the EAP authentication, to derive the key $K_{ASME}$. The device may use the $K_{ASME}$ to derive further keys and use them for LTE NAS and access stratum (AS) security. At the conclusion of the authentication process, the authentication server 104 may send an EAP master session key (MSK) to the control node 108. The control node 108 may use the MSK to derive the key $K_{ASME}$, which may be used by the LTE network 112 to derive further keys and use them for LTE NAS and access stratum (AS) security.

The security context 116 may store information about the LTE network 112, the network certificate 110 of the LTE network 112, a pseudonym 246 associated with the LTE network 112, and/or the authentication process for the LTE network 112. The device 102 may use the one or more security contexts 116 to reconnect to a previously visited LTE network 112. The device 102 may generate a security context 116 after the device 102 is authenticated to the LTE network 112 using the device certificate 114.

Figure 5:
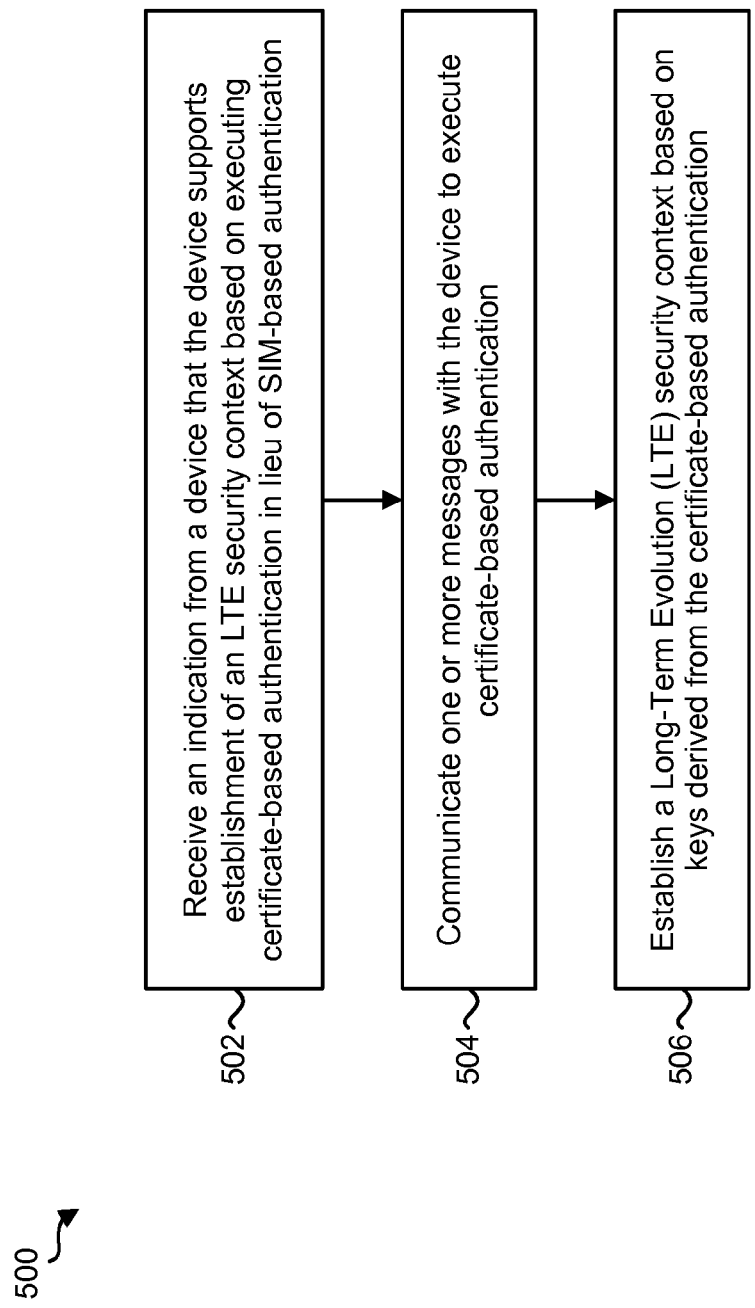
FIG. 5 is a flow diagram illustrating another configuration of a method for authentication that may be performed by a Long-Term Evolution (LTE) network.

FIG. 5 is a flow diagram illustrating another configuration of a method 500 for authentication that may be performed by an LTE network 112. In one configuration, the method 500 may be implemented by one or more network nodes included in the LTE network 112. For example, the LTE network 112 may include an access point 106, a control node 108 and an authentication server 104. A device 102 may be capable of communicating with an LTE network 112. In one configuration, the LTE network 112 may be a neutral-host (NH) LTE network.

The LTE network 112 may receive 502 an indication from a device 102 that the device 102 supports establishment of an LTE security context 116 based on executing certificate-based authentication in lieu of SIM-based authentication. For example, the indication may be received in an Attach message. In one configuration, the indication may be received as part of an Extensible Authentication Protocol (EAP) message (e.g., EAP-Identity message).

The LTE network 112 may communicate 504 one or more messages with the device 102 to execute certificate-based authentication. As described above, the one or more messages may be communicated using LTE non-access stratum (NAS) signaling messages. The one or more messages may include EAP messages.

The LTE network 112 may send a network certificate 110 to the device 102. The device 102 may determine whether the network certificate 110 is signed by a trusted CA 118, whether the network certificate 110 is expired, whether the network certificate 110 is revoked, and/or whether the LTE network 112 is the owner of the network certificate 110.

Communicating the one or more messages with the device 102 to execute the certificate-based authentication may include receiving a device certificate 114 from the device 102. The device 102 may send the device certificate 114 upon verifying the network certificate 110. The LTE network 112 may then validate the device certificate 114.

In one configuration, the LTE network 112 may determine that the received device certificate 114 is a self-signed device certificate 114. In this configuration, the LTE network 112 may validate the device certificate 114 by obtaining a public key for the device 102 from a trusted entity (e.g., a key provisioning service entity (KPSE) 122). The LTE network 112 may then verify that the self-signed device certificate 114 is signed by the device 102 based on the public key.

In another configuration, validating the device certificate 114 may include determining whether the device certificate 114 is signed by a trusted certificate authority (CA) 118. The LTE network 112 may also determine whether the device certificate 114 is expired. The LTE network 112 may additionally determine whether the device 102 owns the device certificate 114.

The LTE network 112 may also validate the device certificate 114 by determining whether the device certificate 114 is revoked. This may be accomplished by the LTE network 112 verifying the device certificate 114 is not in a certificate revocation list (CRL) 324. Alternatively, the LTE network 112 may query a certificate status server 120 (e.g., OCSP server) to determine whether the device certificate 114 is revoked.

The LTE network 112 may also validate the device certificate 114 by determining whether the device 102 is in a list 358 of devices 102 that are allowed access to the LTE network 112 (e.g., a whitelist). Alternatively, the LTE network 112 may determine whether the device 102 is not in a list 360 of devices 102 that are not allowed access to the LTE network 112 (e.g., a blacklist).

The LTE network 112 may establish 506 an LTE security context 116 based on keys derived from the certificate-based authentication. For example, at the conclusion of the authentication process, the authentication server 104 may send an EAP master session key (MSK) to the control node 108. The control node 108 may use the MSK to derive the key $K_{ASME}$, which may be used by the LTE network 112 to derive further keys and use them for LTE NAS and access stratum (AS) security.

The security context 116 may store information about the LTE network 112, the network certificate 110 of the LTE network 112, a pseudonym associated with the LTE network 112, and/or the authentication process for the LTE network 112. The device 102 may use the security context 116 to reconnect to the LTE network 112 during a subsequent visit to the LTE network 112.

Figure 6:
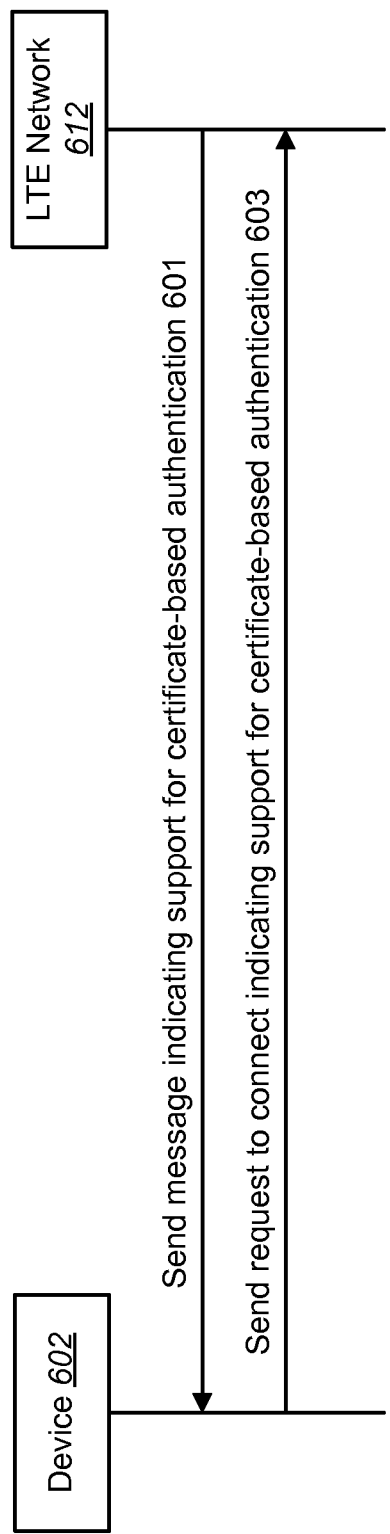
FIG. 6 is a sequence diagram illustrating a procedure for certificate-based authentication.

FIG. 6 is a sequence diagram illustrating a procedure for certificate-based authentication. A device 602 may be capable of communicating with an LTE network 612. In one configuration, the LTE network 612 may be a neutral-host (NH) LTE network.

The LTE network 612 may send 601 a message indicating support for certificate-based authentication. For example, the message may be broadcast by an access point 106 (e.g., base station or evolved nodeB (eNB)) in the neutral-host LTE network 612.

In one configuration, the message may be a system information block (SIB) message. The SIB message may include an indication that the LTE network 612 supports certificate-based authentication and/or neutral-host operation. The indication may be a specific network identifier value reserved for neutral-host use, or another indication that a NH-enabled device 602 understands to mean that the LTE network 612 supports certificate-based authentication. For example, the indication may be included in a new field in an existing SIB message, as a new value in an existing field of an existing SIB message, or as part of a new SIB message.

The device 602 may send 603 a request to connect to the LTE network 612 that indicates the device 602 supports certificate-based authentication. In one configuration, the device 602 may perform a network Attach procedure.

During the Attach procedure, the device 602 may indicate to the LTE network 612 that the device 602 supports neutral-host operation and/or certificate-based authentication, or that the device 602 intends to connect to the neutral-host LTE network 612. The indication may be a network identifier value reserved for neutral-host operation in the Attach signaling or some other mechanism whereby the device 602 informs the LTE network 612 that the device 602 is neutral-host enabled, supports certificate-based authentication, and/or is attempting to connect to the neutral-host LTE network 612.

Figure 7:
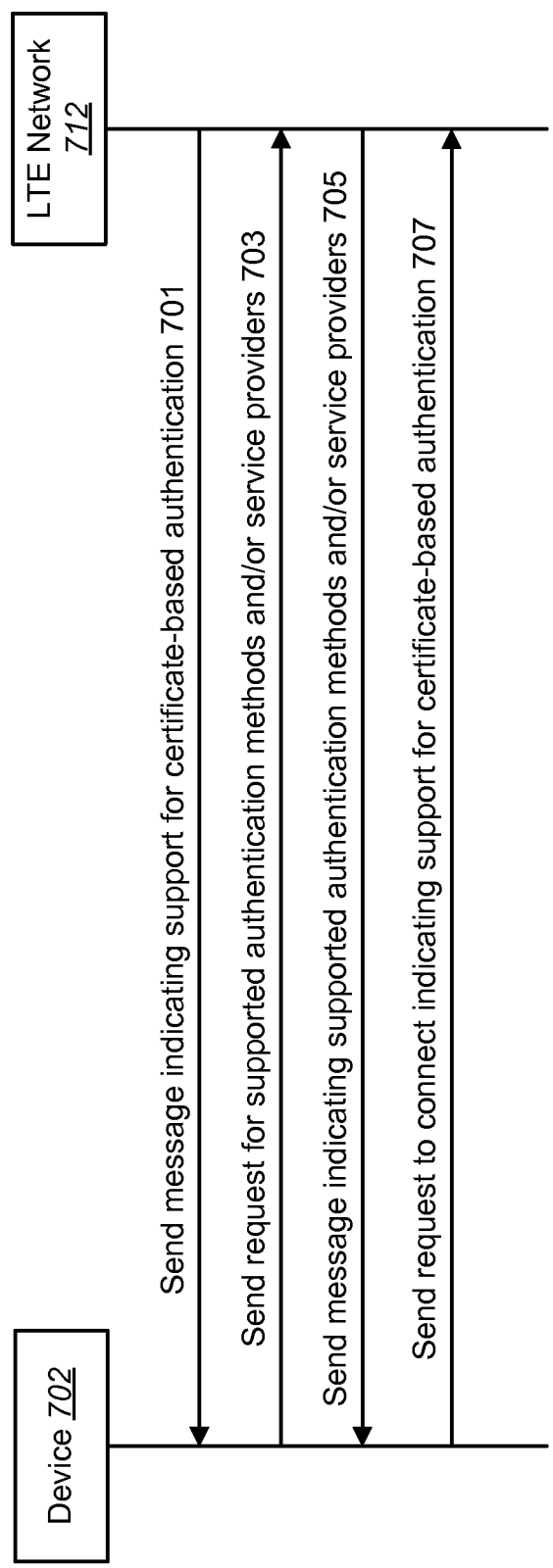
FIG. 7 is a sequence diagram illustrating another procedure for certificate-based authentication.

FIG. 7 is a sequence diagram illustrating another procedure for certificate-based authentication. In FIG. 7, a device 702 may be capable of communicating with an LTE network 712. In one configuration, the LTE network 712 may be a neutral-host (NH) LTE network.

The LTE network 712 may send 701 a message indicating support for certificate-base authentication. For example, the message may be similar to the corresponding message described in FIG. 6.

After receiving the message from the LTE network 712 indicating support for certificate-based authentication, the device 702 may send 703 a request to the LTE network 712 for the authentication methods and/or service providers that the LTE network 712 supports.

The LTE network 712 may send 705 a message indicating the authentication methods and/or service providers that the LTE network 712 supports. Based on this message, the device 702 may determine to authenticate using a device certificate 114 (i.e., certificate-based authentication).

The device 702 may send 707 the LTE network 712 a request to connect that indicates support for certificate-based authentication. For example, the device 702 may indicate support for certificate-based authentication in an Attach message.

After exchanging the messages described in FIG. 6 or 7, the device 702 and the LTE network 712 may exchange signaling messages to enable execution of certificate-based authentication. For example, instead of performing conventional LTE authentication, the device 702 and the LTE network 712 may exchange LTE signaling that enables certificate-based authentication.

On the LTE network 712 side, an authentication server 104 (e.g., an authentication, authorization, and accounting server (AAA) server) may cooperate with a control node 108 (e.g., an MME) that is adapted to support certificate-based authentication to exchange LTE signaling with the device 702. The LTE signaling may comprise non-access stratum (NAS) messages that are designed to transport EAP signaling for AAA-based authentication. The LTE signaling may be exchanged with the device 702 without a pre-established LTE security context 116.

After successful certificate-based authentication, the device 702 and the LTE network 712 may derive keying material based on the certificate-based authentication. At the conclusion of the authentication process, the device 702 may use the EAP master session key (MSK) resulting from the EAP authentication, to derive the key $K_{ASME}$. Furthermore, at the conclusion of the authentication process, the AAA server may send an EAP master session key (MSK) to the MME. The MME may use the MSK to derive the key $K_{ASME}$. The device 702 and the MME may use the keying material, $K_{ASME}$, to derive an LTE security context 116 that is specific to a NH network, including a well-defined set of LTE access stratum (AS) and NAS security keys that may be used to further secure AS and NAS communication between the device 702 and the LTE network 712 (e.g., as specified in 3GPP TS 33.401).

Figure 8:
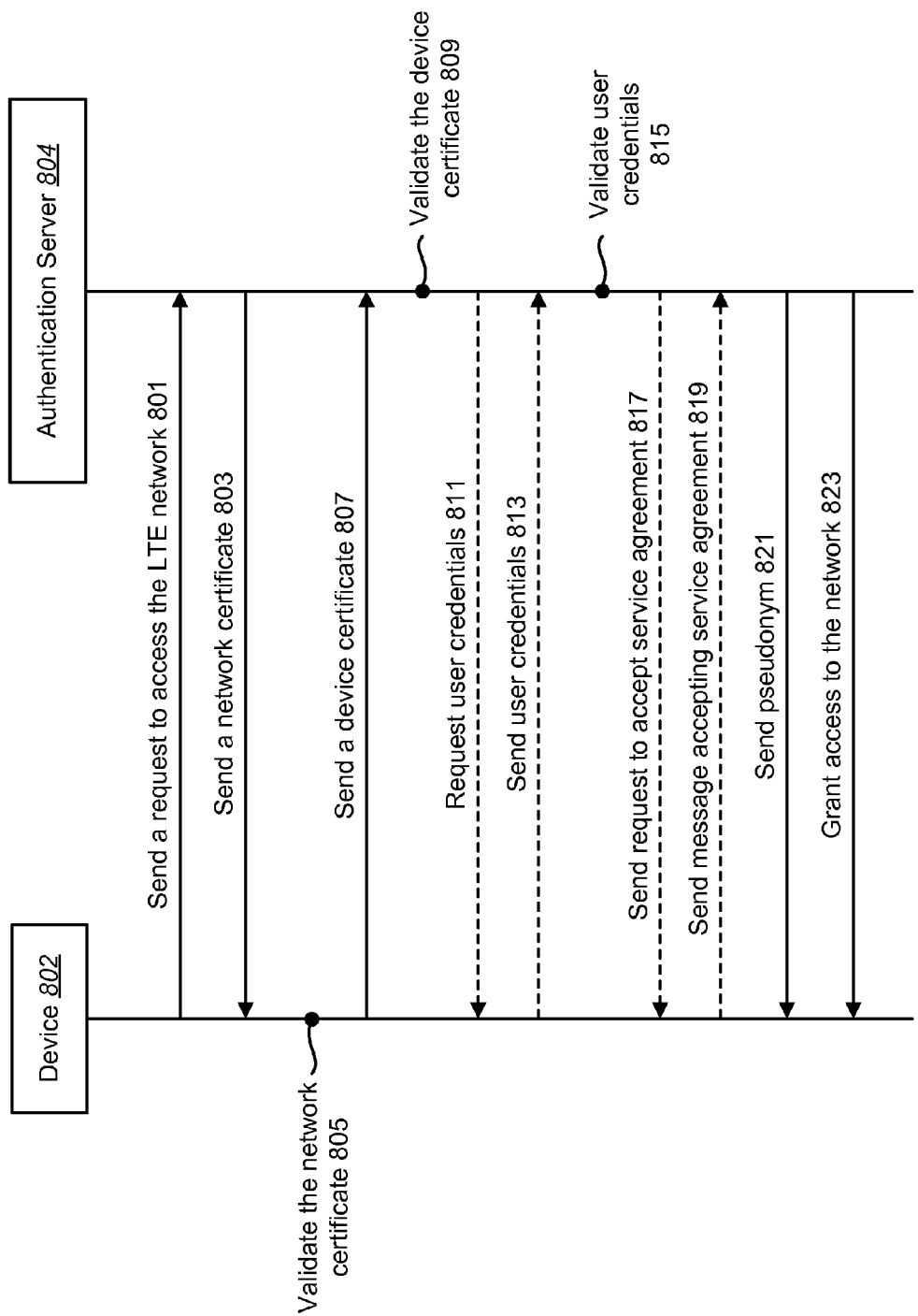
FIG. 8 is yet another sequence diagram illustrating a procedure for certificate-based authentication.

FIG. 8 is a sequence diagram illustrating yet another procedure for certificate-based authentication. In FIG. 8, a device 802 may be capable of communicating with an LTE network 112. In one configuration, the LTE network 112 may be a neutral-host (NH) LTE network. The LTE network 112 may include an authentication server 804.

The device 802 may send 801 a request to access the LTE network 112 to the authentication server 804. The authentication server 804 may send 803 a network certificate 110 to the device 802.

The device 802 may validate 805 the network certificate 110. To validate 805 the network certificate 110, the device 802 may determine whether the network certificate 110 is signed by a trusted CA 118. The device 802 may make this determination based on a stored list 242 of CAs 118 trusted to issue network certificates 110. The device 802 may further determine whether the network certificate 110 is expired. The device 802 may compare the expiration date of the network certificate 110 with the current date. If the current date is later than the expiration date, the device 802 may determine that the network certificate 110 is expired.

To validate 805 the network certificate 110, the device 802 may also determine whether the network certificate 110 is revoked. To determine whether the network certificate 110 is revoked, the device 802 may verify that the network certificate 110 is not in a CRL 224, or the device 802 may query a certificate-status server 120 (e.g., OCSP server).

To validate 805 the network certificate 110, the device 802 may still further determine whether the authentication server 804 owns the network certificate 110. To determine whether the authentication server 804 owns the network certificate 110, the device 802 may encrypt a message using a public key in the network certificate 110 and then verify that the authentication server 804 is able to correctly decrypt the message, thereby demonstrating that the authentication server 804 possesses the private key associated with the network certificate 110.

The device 802 may then send 807 a device certificate 114 to the authentication server 804. In one configuration, to avoid sending the device certificate 114 in the clear, the device 802 may encrypt the device certificate 114 using the public key in the network certificate 110. The authentication server 804 may decrypt the device certificate 114, if necessary, and then validate 809 the device certificate 114.

To validate 809 the device certificate 114, the authentication server 804 may determine whether the device certificate 114 is signed by a trusted certificate authority 118. The authentication server 804 may make this determination based on a stored list 362 of CAs 118 trusted to issue device certificates 114.

To validate 809 the device certificate 114, the authentication server 804 may also determine whether the device certificate 114 is expired. The authentication server 804 may compare the expiration date of the device certificate 114 with the current date. If the current date is later than the expiration date, the authentication server 804 may determine that the device certificate 114 is expired.

To validate 809 the device certificate 114, the authentication server 804 may also determine whether the device certificate 114 is revoked. To determine whether the device certificate 114 is revoked, the authentication server 804 may verify that the device certificate 114 is not in a CRL 324, or the authentication server 804 may query an OCSP server.

To validate 809 the device certificate 114, the authentication server 804 may also determine whether the device 802 owns the device certificate 114. To determine whether the device 802 owns the device certificate 114, the authentication server 804 may encrypt a message using a public key in the device certificate 114 and may then verify that the device 802 is able to correctly decrypt the message, thereby demonstrating that the device 802 possesses the private key associated with the device certificate 114. In another configuration, the device certificate 114 may be a self-signed device certificate 114. The self-signed device certificate 114 of the device 802 may be validated by the authentication server 804 using the public key of the device 802 obtained from a trusted entity (e.g., a KPSE 122).

In one configuration, the authentication server 804 may further validate 809 the device certificate 114 by determining whether the device 802 is in a list 358 of devices 802 that are allowed access to the network 112 (i.e., a whitelist). In another configuration, the authentication server 804 may determine whether the device 802 is in a list 360 of devices 802 that are not allowed access to the network 112 (i.e., a blacklist) In yet another configuration, the authentication server 804 may check the whitelist or the blacklist instead of determining whether the device certificate 114 is revoked.

In some configurations, the authentication server 804 may then request 811 user credentials 228 from the device 802. The device 802 may send 813 user credentials 228. The authentication server 804 may validate 815 the user credentials 228. For example, the authentication server 804 may verify that a password is associated with a username. Other methods for verifying user credentials 228, such as the use of a secure token or biometrics, may also be used. The authentication server 804 may grant the device 802 access to an LTE network 112 based on the user credentials 228.

In other configurations, the authentication server 804 may send 817 the device 802 a request to accept a service agreement 354. The request may include a copy of the service agreement 354. The service agreement 354 may specify conditions for network access. The service agreement 354 may also comprise billing information associated with network access. The device 802 may send 819 a message to the authentication server 804 accepting the service agreement 354.

In yet other configurations, the authentication server 804 may send 821 a pseudonym 246 or other re-authentication identity to the device 802. In subsequent visits to the network 112, the device 802 may use the pseudonym 246 in place of the device certificate 114 to authenticate to the network 112. Using the pseudonym 246 in place of the device certificate 114 may enhance user privacy.

The authentication server 804 may then grant 823 the device 802 access to the network 112. The access may be governed by the service and billing conditions set forth in the service agreement 354.

Figure 9:
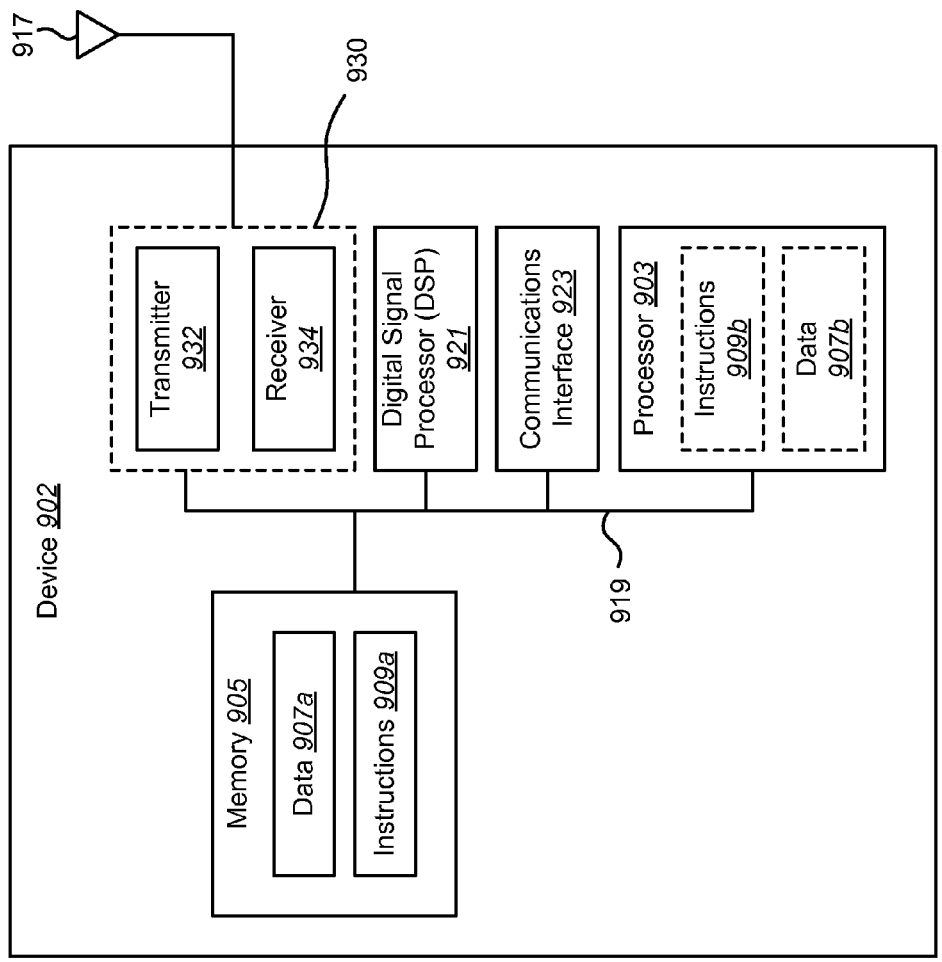
FIG. 9 shows certain components that may be included in a device.

FIG. 9 shows certain components that may be included in a device 902. The device 902 described in connection with FIG. 9 may be an example of and/or may be implemented in accordance with one or more of the devices 102, 202, 602, 702, 802 described in connection with one or more of FIGS. 1-8.

The device 902 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the device 902 of FIG. 9, in an alternative configuration, a combination of processors (e.g., an ARM and DSP) could be used.

The device 902 also includes memory 905 in electronic communication with the processor (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907*a* and instructions 909*a* may be stored in the memory 905. The instructions may include one or more programs, routines, sub-routines, functions, procedures, code, etc. The instructions may include a single computer-readable statement or many computer-readable statements. The instructions 909*a* may be executable by the processor 903 to implement the methods disclosed herein. Executing the instructions 909*a* may involve the use of the data 907*a* that is stored in the memory 905. When the processor 903 executes the instructions 909, various portions of the instructions 909*b* may be loaded onto the processor 903, and various pieces of data 907*b* may be loaded onto the processor 903.

The device 902 may also include a transmitter 932 and a receiver 934 to allow transmission and reception of signals to and from the device 902 via an antenna 917. The transmitter 932 and receiver 934 may be collectively referred to as a transceiver 930. The device 902 may also include (not shown) multiple transmitters, multiple antennas, multiple receivers and/or multiple transceivers.

The device 902 may include a digital signal processor (DSP) 921. The device 902 may also include a communications interface 923. The communications interface 923 may allow a user to interact with the device 902.

The various components of the device 902 may be coupled together by one or more buses, which may include a power bus, a control signal bus, a status signal bus, a data bus, etc. For the sake of clarity, the various buses are illustrated in FIG. 9 as a bus system 919.

Figure 10:
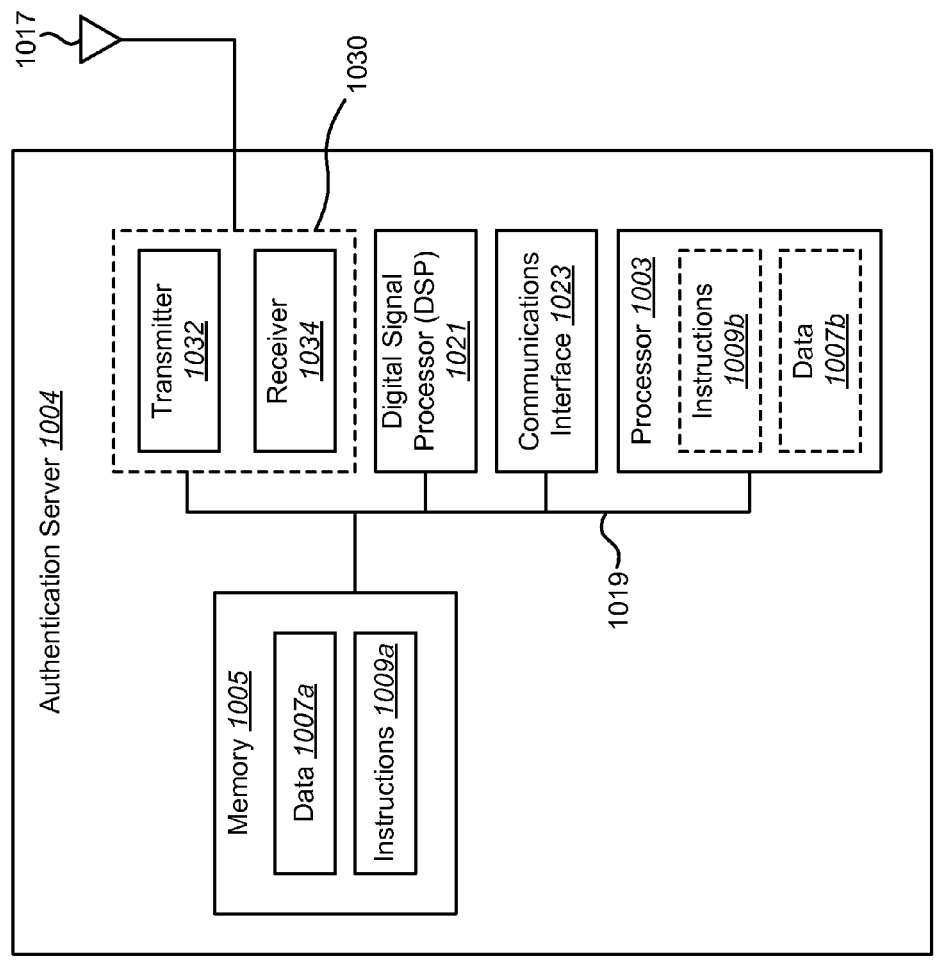
FIG. 10 shows certain components that may be included in an authentication server.

FIG. 10 shows certain components that may be included in an authentication server 1004. The authentication server 1004 described in connection with FIG. 10 may be an example of and/or may be implemented in accordance with one or more of the authentication servers 104, 304, 804 or network nodes described in connection with one or more of FIGS. 1-8.

The authentication server 1004 includes a processor 1003. The processor 1003 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1003 may be referred to as a central processing unit (CPU). Although just a single processor 1003 is shown in the authentication server 1004 of FIG. 10, in an alternative configuration, a combination of processors (e.g., an ARM and DSP) could be used.

The authentication server 1004 also includes memory 1005 in electronic communication with the processor (i.e., the processor can read information from and/or write information to the memory). The memory 1005 may be any electronic component capable of storing electronic information. The memory 1005 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions may include one or more programs, routines, sub-routines, functions, procedures, code, etc. The instructions may include a single computer-readable statement or many computer-readable statements. The instructions 1009a may be executable by the processor 1003 to implement the methods disclosed herein. Executing the instructions 1009a may involve the use of the data 1007a that is stored in the memory 1005. When the processor 1003 executes the instructions 1009, various portions of the instructions 1009b may be loaded onto the processor 1003, and various pieces of data 1007b may be loaded onto the processor 1003.

The authentication server 1004 may also include a transmitter 1032 and a receiver 1034 to allow transmission and reception of signals to and from the authentication server 1004 via an antenna 1017. The transmitter 1032 and receiver 1034 may be collectively referred to as a transceiver 1030. The authentication server 1004 may also include (not shown) multiple transmitters, multiple antennas, multiple receivers and/or multiple transceivers.

The authentication server 1004 may include a digital signal processor (DSP) 1021. The authentication server 1004 may also include a communications interface 1023. The communications interface 1023 may allow a user to interact with the authentication server 1004.

The various components of the authentication server 1004 may be coupled together by one or more buses, which may include a power bus, a control signal bus, a status signal bus, a data bus, etc. For the sake of clarity, the various buses are illustrated in FIG. 10 as a bus system 1019.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as illustrated by FIGS. 4-8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for authentication, operational in a device configured to communicate with a Long-Term Evolution (LTE) network, comprising:
provisioning the device with a device certificate at a time the device is manufactured, wherein the device certificate uniquely identifies the device, and wherein the device certificate is based on at least one or a combination of a serial number, a media access control (MAC) address, an international mobile station equipment identity (IMEI), or an international mobile subscriber identity (IMSI);
receiving a system information broadcast (SIB) message from the LTE network that indicates the LTE network supports establishment of an LTE security context based on executing certificate-based authentication in lieu of subscriber identity module (SIM)-based authentication;
communicating one or more messages with the LTE network to execute certificate-based authentication; and
establishing the LTE security context based on keys derived from the certificate-based authentication.

2. The method of claim 1, further comprising receiving a second message from the LTE network that indicates one or more authentication methods and one or more service providers supported by the LTE network.

3. The method of claim 2, further comprising receiving the second message in response to sending a request from a device.

4. The method of claim 1, wherein the one or more messages are communicated using one or more LTE non-access stratum (NAS) signaling messages.

5. The method of claim 1, wherein the one or more messages include one or more Extensible Authentication Protocol (EAP) messages.

6. The method of claim 5, wherein the one or more EAP messages are communicated using one or more LTE NAS signaling messages.

7. The method of claim 5, wherein the certificate based authentication is performed using EAP—Transport Layer Security (EAP-TLS) or EAP—Tunneled Transport Layer Security (EAP-TTLS).

8. The method of claim 1, wherein communicating the one or more messages with the LTE network to execute the certificate-based authentication comprises:
receiving a network certificate from an authentication server; and
validating the network certificate.

9. The method of claim 8, wherein validating the network certificate comprises one or more of:
determining whether the network certificate is signed by a trusted certificate authority;
determining whether the network certificate is expired;
determining whether the network certificate is revoked; or
determining whether the authentication server owns the network certificate.

10. The method of claim 9, wherein determining whether the network certificate is revoked comprises:
verifying the network certificate is not in a certificate revocation list (CRL); or
querying an Online Certificate Status Protocol (OCSP) server.

11. The method of claim 9, wherein communicating the one or more messages with the LTE network to execute the certificate-based authentication further comprises sending a device certificate to the authentication server, wherein the device certificate is encrypted based on information in the network certificate.

12. The method of claim 1, further comprising:
receiving a request for user credentials; and
sending user credentials to the LTE network.

13. The method of claim 1, further comprising:
receiving a pseudonym from the LTE network; and sending the pseudonym to the LTE network instead of a device certificate in subsequent attempts to gain access to the LTE network.

14. The method of claim 1, further comprising:
receiving a request to accept a service agreement; and
sending a message accepting the service agreement.

15. The method of claim 1, further comprising provisioning a device with a device certificate using an enterprise certificate enrollment process.

16. The method of claim 15, wherein the enterprise certificate enrollment process utilizes Simple Certificate Enrollment Protocol (SCEP).

17. The method of claim 1, further comprising generating a self-signed device certificate on a device using public and private key pairs specific to the device.

18. The method of claim 17, further comprising generating the public and private key pairs on the device using a secret key programmed into a system-on-chip (SoC), wherein the secret key is shared with a trusted entity.

19. The method of claim 17, further comprising generating the public and private key pairs by running a key-provisioning protocol between the device and a trusted entity.

20. An apparatus configured to communicate with a Long-Term Evolution (LTE) network, comprising:
a device certificate generator configured to provision the device with a device certificate at a time the device is manufactured, wherein the device certificate uniquely identifies the device, and wherein the device certificate is based on at least one or a combination of a serial number, a media access control (MAC) address, an international mobile station equipment identity (IMEI), or an international mobile subscriber identity (IMSI);
a transceiver configured to:
receive a system information broadcast (SIB) message from the LTE network that indicates the LTE network supports establishment of an LTE security context based on executing certificate-based authentication in lieu of SIM-based authentication; and
communicate one or more messages with the LTE network to execute certificate-based authentication; and
a security-context establisher configured to establish the LTE security context based on keys derived from the certificate-based authentication.

21. An apparatus configured to communicate with a Long-Term Evolution (LTE) network, comprising:
means for provisioning the device with a device certificate at a time the device is manufactured, wherein the device certificate uniquely identifies the device, and wherein the device certificate is based on at least one or a combination of a serial number, a media access control (MAC) address, an international mobile station equipment identity (IMEI), or an international mobile subscriber identity (IMSI);
means for receiving a system information broadcast (SIB) message from the LTE network that indicates the LTE network supports establishment of an LTE security context based on executing certificate-based authentication in lieu of SIM-based authentication;
means for communicating one or more messages with the LTE network to execute certificate-based authentication; and
means for establishing the LTE security context based on keys derived from the certificate-based authentication.

22. A non-transitory computer-readable medium comprising codes for causing a computer to:

provision the device with a device certificate at a time the device is manufactured, wherein the device certificate uniquely identifies the device, and wherein the device certificate is based on at least one or a combination of a serial number, a media access control (MAC) address, an international mobile station equipment identity (IMEI), or an international mobile subscriber identity (IMSI);
receive a system information broadcast (SIB) message from an LTE network that indicates the LTE network supports establishment of an LTE security context based on executing certificate-based authentication in lieu of SIM-based authentication;
communicate one or more messages with the LTE network to execute certificate-based authentication; and
establish the LTE security context based on keys derived from the certificate-based authentication.

23. A method for authentication in a Long-Term Evolution (LTE) network, comprising:
sending a system information broadcast (SIB) message that indicates the LTE network supports establishment of an LTE security context based on executing certificate-based authentication in lieu of subscriber identity module (SIM)-based authentication;
receiving an indication from a device that the device supports establishment of the LTE security context based on executing certificate-based authentication in lieu of SIM-based authentication;
communicating one or more messages with the device to execute certificate-based authentication, wherein the one or more messages include one or more Extensible Authentication Protocol (EAP) messages, and wherein the certificate-based authentication is performed using EAP—Transport Layer Security (EAP-TLS) or EAP—Tunneled Transport Layer Security (EAP-TTLS); and
establishing the LTE security context based on keys derived from the certificate-based authentication.

24. The method of claim 23, wherein the indication is received in an Attach message.

25. The method of claim 23, wherein the indication is received as part of an EAP message.

26. The method of claim 23, wherein the one or more messages are communicated using one or more LTE non-access stratum (NAS) signaling messages.

27. The method of claim 23, wherein the one or more EAP messages are communicated using one or more LTE NAS signaling messages.

28. The method of claim 23, wherein communicating the one or more messages with the device to execute the certificate-based authentication comprises:
receiving a device certificate from the device; and
validating the device certificate.

29. The method of claim 28, wherein validating the device certificate comprises:
determining that the device certificate is a self-signed device certificate;
obtaining a public key for the device from a trusted entity; and
verifying the self-signed device certificate is signed by the device based on the public key.

30. The method of claim 28, wherein validating the device certificate comprises one or more of:
determining whether the device certificate is signed by a trusted certificate authority;
determining whether the device certificate is expired; or
determining whether the device owns the device certificate.

31. The method of claim 30, wherein validating the device certificate further comprises determining whether the device certificate is revoked.

32. The method of claim 31, wherein determining whether the device certificate is revoked comprises one or a combination of:
- verifying the device certificate is not in a certificate revocation list (CRL); or
- querying an Online Certificate Status Protocol (OCSP) server.

33. The method of claim 30, wherein validating the device certificate further comprises one or a combination of:
- determining whether the device is in a list of devices that are allowed access to the LTE network; or
- determining whether the device is not in a list of devices that are not allowed access to the LTE network.

34. The method of claim 23, further comprising sending the device a network certificate.

35. The method of claim 23, further comprising:
- sending the device a request for user credentials;
- receiving user credentials from the device;
- validating the user credentials; and
- granting the device access to the LTE network based on the user credentials.

36. The method of claim 23, further comprising:
- sending the device a pseudonym; and
- receiving the pseudonym from the device instead of a device certificate in subsequent requests to gain access to the LTE network.

37. The method of claim 23, further comprising:
- sending the device a request to accept a service agreement;
- receiving from the device a message accepting the service agreement; and
- granting the device access to the LTE network based on the message accepting the service agreement.

38. An apparatus for authentication in a Long-Term Evolution (LTE) network, comprising:
- a transceiver configured to:
  - send a system information broadcast (SIB) message that indicates the LTE network supports establishment of an LTE security context based on executing certificate-based authentication in lieu of subscriber identity module (SIM)-based authentication;
  - receive an indication from a device that the device supports establishment of the LTE security context based on executing certificate-based authentication in lieu of SIM-based authentication; and
  - communicate one or more messages with the device to execute certificate-based authentication, wherein the one or more messages include one or more Extensible Authentication Protocol (EAP) messages, and wherein the certificate-based authentication is performed using EAP—Transport Layer Security (EAP-TLS) or EAP—Tunneled Transport Layer Security (EAP-TTLS); and
- a security-context establisher configured to establish the LTE security context based on keys derived from the certificate-based authentication.

39. An apparatus for authentication in a Long-Term Evolution (LTE) network, comprising:
- means for sending a system information broadcast (SIB) message that indicates the LTE network supports establishment of an LTE security context based on executing certificate-based authentication in lieu of subscriber identity module (SIM)-based authentication;
- means for receiving an indication from a device that the device supports establishment of the LTE security context based on executing certificate-based authentication in lieu of SIM-based authentication;
- means for communicating one or more messages with the device to execute certificate-based authentication, wherein the one or more messages include one or more Extensible Authentication Protocol (EAP) messages, and wherein the certificate-based authentication is performed using EAP—Transport Layer Security (EAP-TLS) or EAP—Tunneled Transport Layer Security (EAP-TTLS); and
- means for establishing the LTE security context based on keys derived from the certificate-based authentication.

40. A non-transitory computer-readable medium comprising codes for causing a computer to:
- send a system information broadcast (SIB) message that indicates the LTE network supports establishment of an LTE security context based on executing certificate-based authentication in lieu of subscriber identity module (SIM)-based authentication;
- receive an indication from a device that the device supports establishment of a Long-Term Evolution (LTE) security context based on executing certificate-based authentication in lieu of SIM-based authentication;
- communicate one or more messages with the device to execute certificate-based authentication, wherein the one or more messages include one or more Extensible Authentication Protocol (EAP) messages, and wherein the certificate-based authentication is performed using EAP—Transport Layer Security (EAP-TLS) or EAP—Tunneled Transport Layer Security (EAP-TTLS); and
- establish the LTE security context based on keys derived from the certificate-based authentication.

* * * * *